June 22, 1971   T. E. BRANSCUM ET AL   3,585,681
BLOW MOLDING APPARATUS

Filed June 5, 1967   2 Sheets-Sheet 1

INVENTORS
T. E. BRANSCUM
B. T. MORGAN
D. L. PETERS

BY *Young & Quigg*

ATTORNEYS

United States Patent Office 3,585,681
Patented June 22, 1971

---

3,585,681
BLOW MOLDING APPARATUS
Tony E. Branscum, Winfield, Kans., and Bill T. Morgan and Donald L. Peters, Bartlesville, Okla., assignors to Phillips Petroleum Company
Filed June 5, 1967, Ser. No. 643,572
Int. Cl. B29d 23/03
U.S. Cl. 18—5
4 Claims

ABSTRACT OF THE DISCLOSURE

A hollow object having an integral hollow adjunct portion is formed by blow molding. Two mold parts pinch off a portion of the parison to form the adjunct, and the remainder of the parison forms the main body of the blown object.

BACKGROUND OF THE INVENTION

This invention relates to an apparatus for blow molding hollow articles, particularly hollow articles having an attached hollow adjunct. Specific examples of articles which can be blow molded by the process and apparatus of this invention are bottles having an attached hollow handle portion, or hollow container lids having an attached hollow handle protruding therefrom.

It has previously been proposed to produce such an article in a blow molding process by means of a mold having slidable insert portions. After closing of the mold, the insert portions would move to pinch off a portion of the parison, forming a main body portion and an adjunct portion. Following the pinching off, both portions can be blown into conformity with the mold. This blowing can be accomplished through a single fluid port if there is open fluid communication provided between the main body portion and the adjunct portion, or each portion can be blown separately if such fluid communication is not provided. Such a mold is disclosed and claimed in copending application Ser. No. 452,996 filed May 4, 1965, now U.S. Pat. 3,424,829.

The invention can be best understood by reference to the accompanying drawings, of which:

FIGS. 1 and 2 show a cross section through the mold of said patent illustrating the method of that patent application for molding a hollow article with an attached hollow adjunct.

FIG. 3 is an axonometric view in partial section of an article produced by the method of said patent.

FIG. 4 shows a cross section through the open mold of the invention illustrating the three distinct parts of the mold and a diagrammatic representation of controls assuring the closing of the quarter molds before the mold halves are closed.

FIG. 5 shows a cross section through the mold of the invention illustrating the two parts of the upper portion of the mold closed to pinch out a portion of the parison before closing with the bottom portion of the mold to complete the blowing operation.

A mold of the type shown in the copending application is illustrated in FIG. 1. As is shown in this drawing, mold halves 11 and 12 have cavities into which a parison 13 is blown. After the parison has been partially inflated, so that it substantially fills the cavity, insert portions 14 and 15 slide inwardly to pinch off a portion of the parison.

FIG. 2 shows the mold of the prior art in the completely closed position with inserts 14 and 15 having closed to segregate the main body portion 16 of the parison from adjunct portion 17. Following this segregation of the two portions, blowing fluid is admitted to both portions to expand them into conformity with the mold. Pinched out portion 18 of the parison is discarded.

The two of article which can be made by such a process is shown in FIG. 3, which illustrates a hollow container cover with an integral hollow handle. In this figure, the main body portion of the parison is shown as 16, and the handle adjunct as 17.

When manufacturing certain types of articles, difficulty may be encountered in use of the prior art molds, resulting in uneven distribution of plastic across the portion of the article where the insert slides.

The cause of these difficulties in the prior art methods is illustrated in the drawings. Referirng to FIG. 1, it can be seen that when the parison is partially blown it will contact the walls of the mold at several locations. It is common to have such a point of contact along the wall of the insert, as, for example, at point 19. As the insert closes, the molten plastic will tend to stick to it at several points. The molten plastic is therefore stretched in certain areas and builds up additional thickness in other areas as is illustrated in FIG. 2. The finished article therefore has weak spots (i.e., thin areas), and has the appearance of being striated or wrinkled.

Such a part having these weak spots or thin areas is not commercially acceptable.

SUMMARY OF THE INVENTION

We have solved the problems of the prior art by providing a three-part mold in which the order of closing the mold parts is such that there is no sliding of any mold part along the surface of the parison. We accomplish this by splitting one of our mold halves into two quarter molds, the corresponding faces of these quarter molds having pinch-out means and a cavity for the formation of the adjunct portion of the finished piece. The quarter molds close to each other first, pinching out the adjunct before the other mold half is advanced to complete the mold closing operation.

DESCRIPTION OF THE DRAWINGS

The mold of our invention as shown in FIGS. 4 and 5 consists of a half mold 21, and another half mold 22 which is split into two quarter molds 23 and 24. It is to be understood that our use of the terms "quarter" and "half" as related to the mold does not necessarily indicate that the various sections of the mold must be symmetrical, but are merely convenient expressions to illustrate the operation of our mold.

The mold in FIG. 4 is shown to be fully open. When it is in this position, parison 26 is inserted between the mold parts. This parison can be supplied directly from an extruder, or can be a closed tube which has been extruded elsewhere and brought to the blow mold of our invention after proper heating.

After the parison is in position, mold quarters 23 and 24 are closed by the action of pneumatic cylinders 27 and 28.

Following the pinching off operation, the mold halves 21 and 22 are closed together, and blowing of the main body and the adjunct takes place according to standard blowing methods in the art.

Figure 1:
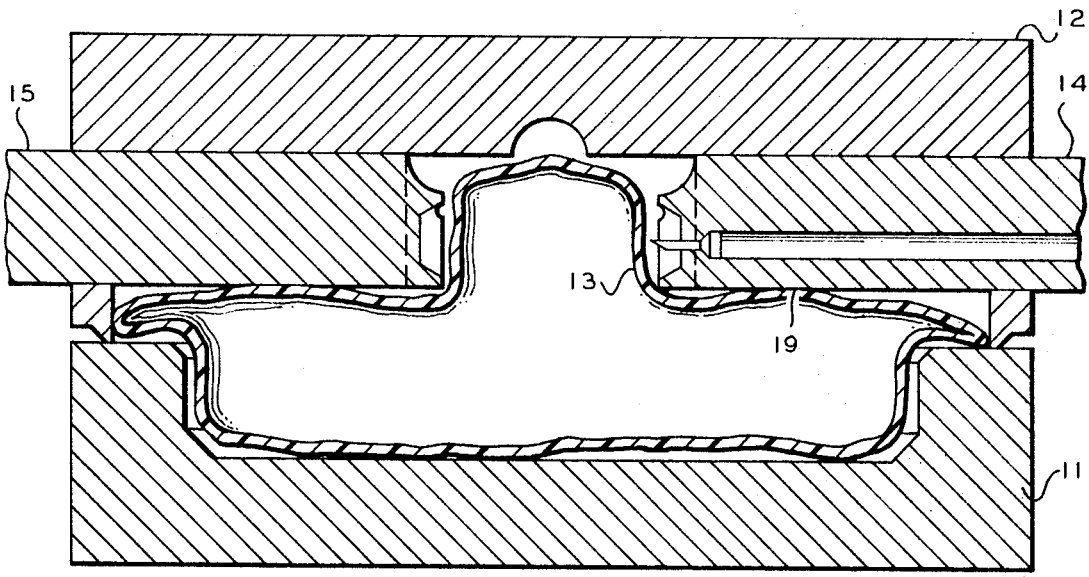
Figure 2:
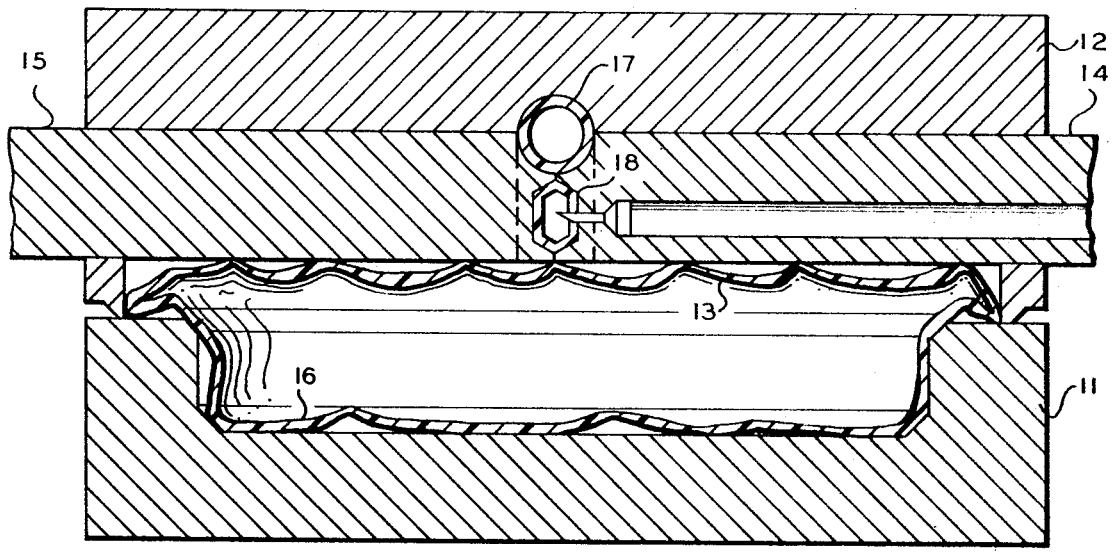
Figure 3:
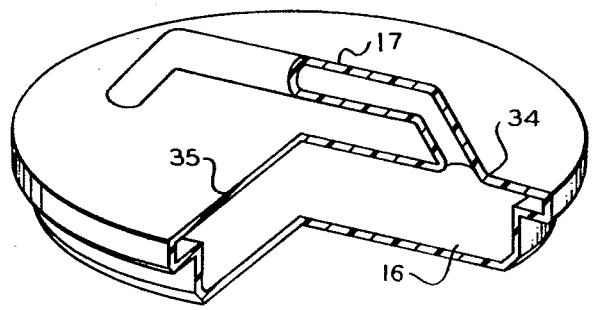

If there is fluid communication between the adjunct portion and the main body portion, as is shown in FIG. 3, the blowing of the entire object can take place through a single port or needle. One means of blowing an article of this type is through needle 35, as is disclosed and claimed in copending application Ser. No. 452,997 filed May 4, 1965. If desired, however, the mold could be designed so as to pinch closed a web of plastic between the adjunct portion and the main body portion, thus blocking fluid communication between the two portions. In such a case, it would be necessary to use a separate blowing port or needle for each portion.

Figure 4:
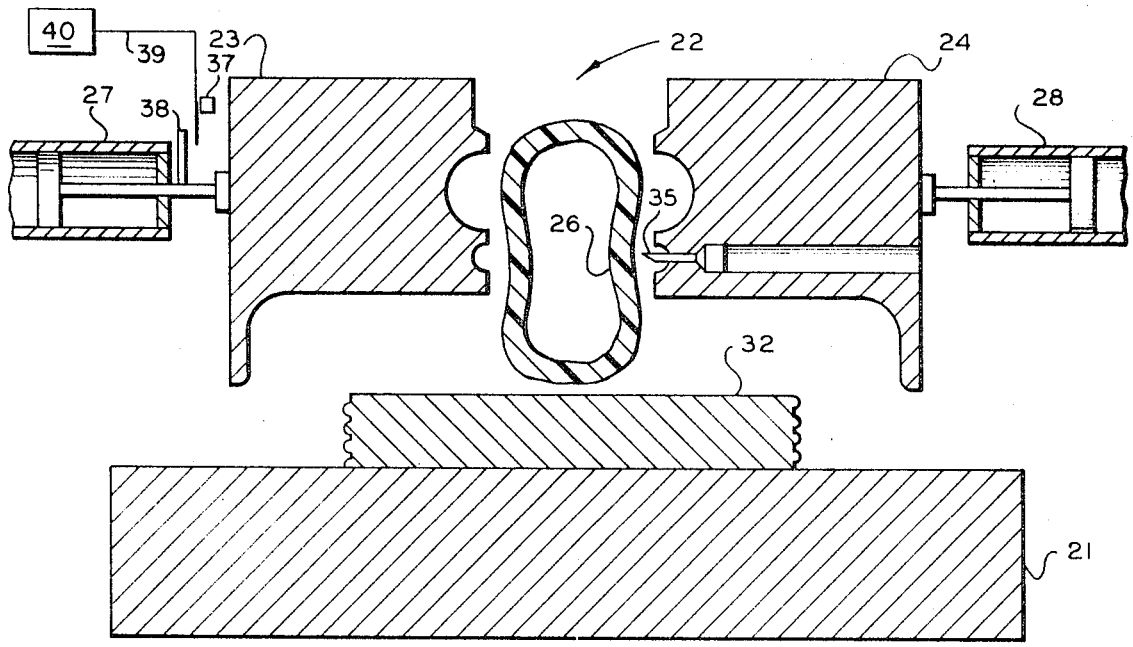
As shown in FIG. 4, 38 is a lever mounted on the mold actuating arm of pneumatic cylinder 27. When the parison is in position, the programmed cycle requires the quarter molds to close and as they do lever 38 actuates microswitch 37 sending a signal along conduit 39 to time delay 40. Time delay 40 sends out a signal which initiates closing of mold halves 21 and 22 so that they are closed immediately after the quarter molds 23 and 24 are closed. This closing of the quarter molds, as shown in FIG. 5 pinches off the adjunct portion of the parison, as is shown at 29 from the main body 31. It should be noted that this closing does not cause any portion of the mold to slide along the surface of the parison, and we therefore avoid the pulling and stretching of the walls of the parison which was a problem of the prior art.
Figure 5:
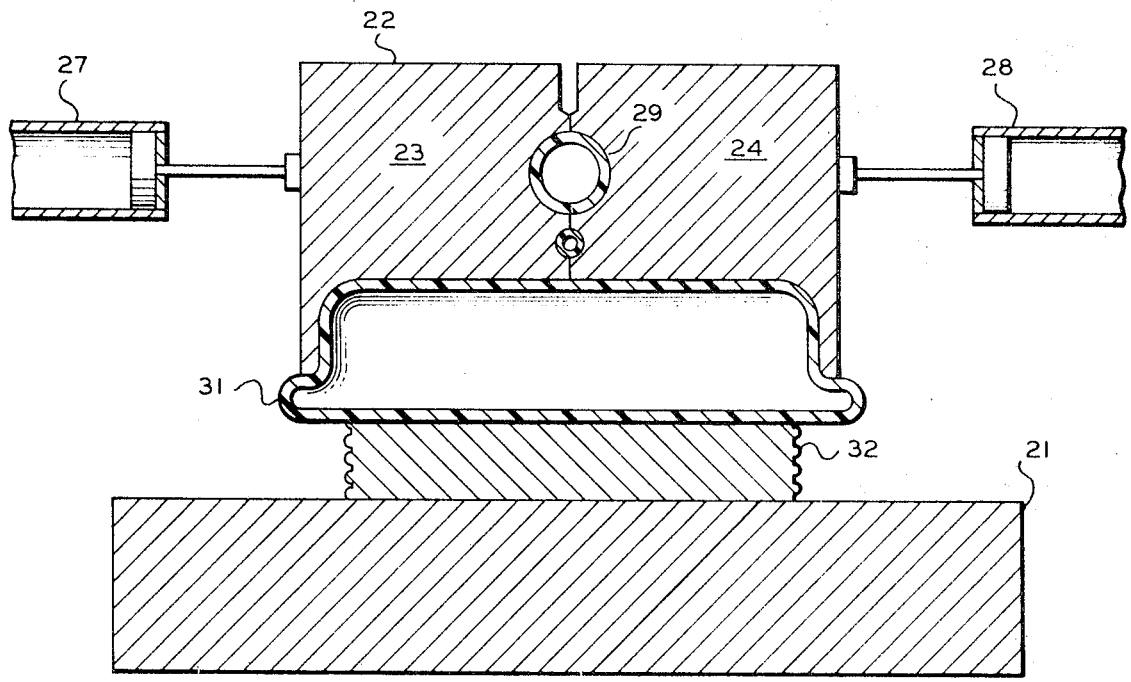

Molds used in the practice of our invention may have many of the features of other molds which have been disclosed in the prior art. In FIGS. 4 and 5, for example, we have shown lower mold half 21 to be provided with a threaded male member 32 which will form internal threads on the walls of the container lid of this invention. In such an embodiment, member 32 would be rotatable so that it could be screwed out of the thermoplastic lid after cooling. In another embodiment, member 32 or one of the other members of the mold can be provided with retractable protrusions which form undercut portions in the molded article.

DESCRIPTION OF THE PREFERRED EMBODIMENT

In a currently preferred embodiment of our invention, we produce a container lid such as that shown in FIG. 3. A measurement of the thickness of the top portion of this container at various points shows that we have considerably improved the uniformity of the top thickness over similar lids produced by the prior art method discussed above.

We have found that we can obtain parts having a thickness of 105 mils on the top of the container beyond the end of the handle at point 34 of FIG. 3, and a thickness of 55 mils at point 35, which is 90 degrees from the axis of the handle. A similar article made by the prior art method has a wall thickness of 103 mils at point 34, and only 20 mils at point 35. It is thus seen that we have greatly improved the uniformity of distribution of material in the top of the container lid over the prior art method. Our invention is suitable for use with any thermoplastic material which can be blow molded, and is particularly suited for use with the polyolefins such as polyethylene and propylene and copolymers thereof.

Reasonable variation and modification are permissible within the scope of the disclosed invention without departing from the spirit thereof.

We claim:
1. A mold for blow molding a parison comprising in combination:
   a first mold half;
   a second mold half split into two quarter molds; corresponding cavities in said first and second mold halves defining a main body area for the expansion of the main body of said parison;
   corresponding cavities in the two said quarter molds defining an adjunct area for the expansion of a segregated portion of said parison;
   pinching means in said quarter molds for segregating a portion of said parison from the main body of said parison;
   means for closing said quarter molds prior to closing said half molds; and
   fluid inlet means for admitting blowing fluid to said main body and said portion of said parison.
2. The mold of claim 1 wherein the corresponding faces of the two said quarter molds are perpendicular to the face of said first mold half.
3. The mold of claim 1 wherein said pinching means contain a cavity therethrough providing open fluid communication between said main body and said segregated portion.
4. The mold of claim 3 wherein said pinching means contain a variety therethrough at each end of said segregated portion.

References Cited
UNITED STATES PATENTS
| | | | |
|---|---|---|---|
| 3,278,666 | 10/1966 | Donald | 18—5BZX |
| 3,381,068 | 4/1968 | Leiper et al. | 18—5BZU |
| 3,424,829 | 1/1969 | Peters et al. | 18—5BZX |

J. SPENCER OVERHOLSER, Primary Examiner

M. O. SUTTON, Assistant Examiner

U.S. Cl. X.R.

264—94